June 23, 1964 S. A. OAKLEY 3,138,308
TUBE CUTTING APPARATUS
Filed May 8, 1961 3 Sheets-Sheet 3
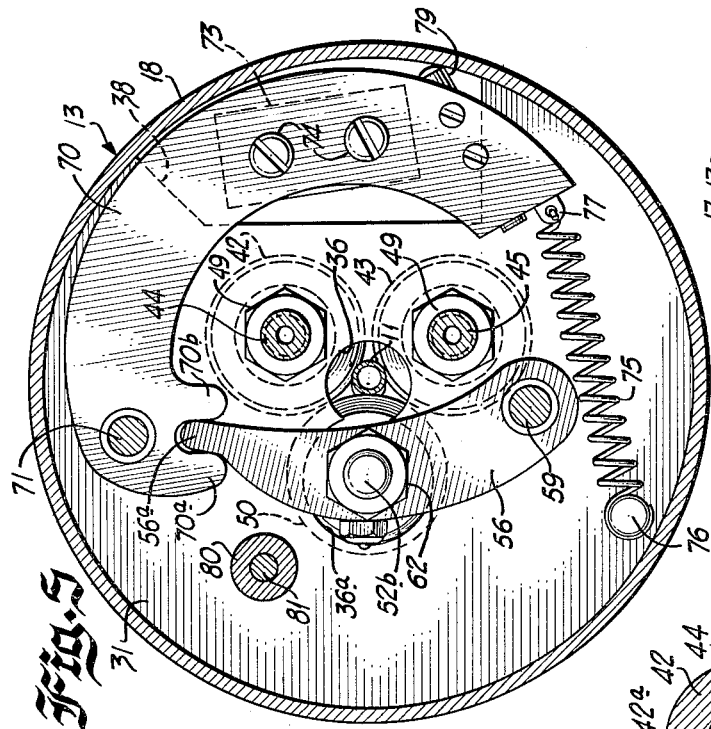
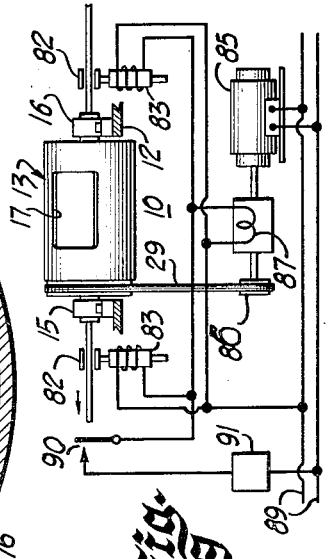
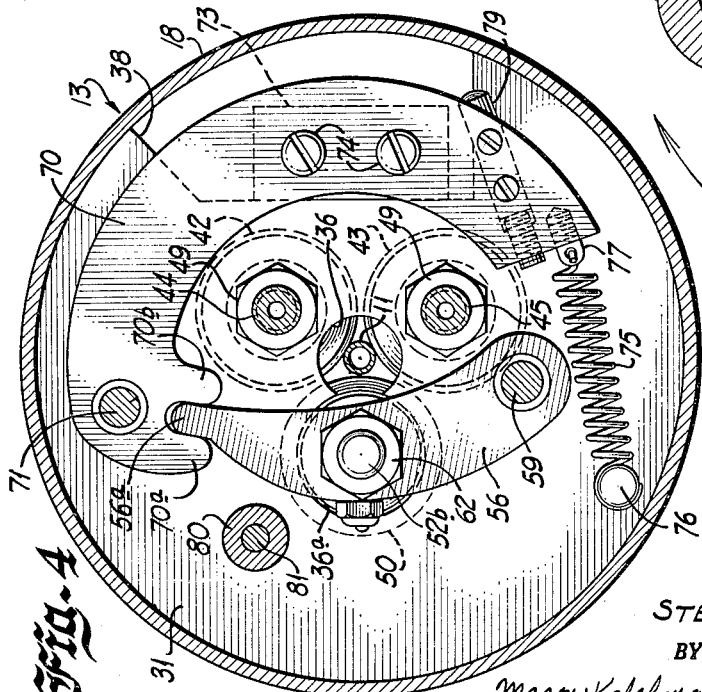
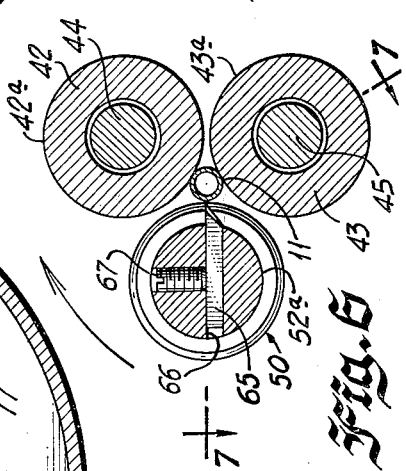
INVENTOR.
STERLING A. OAKLEY
BY
Mason, Kolehmainen, Rathburn and Wyss
ATTORNEYS.

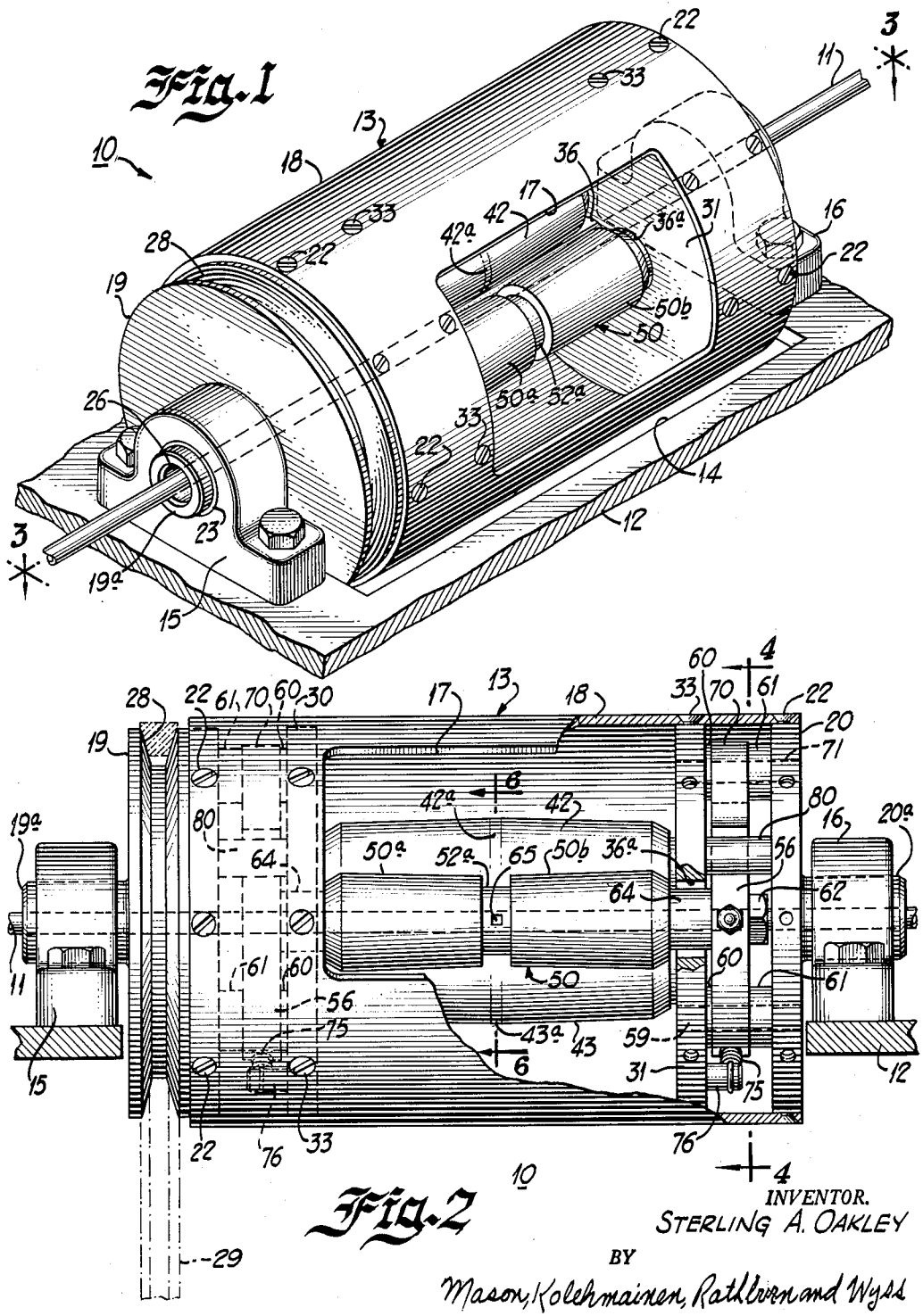

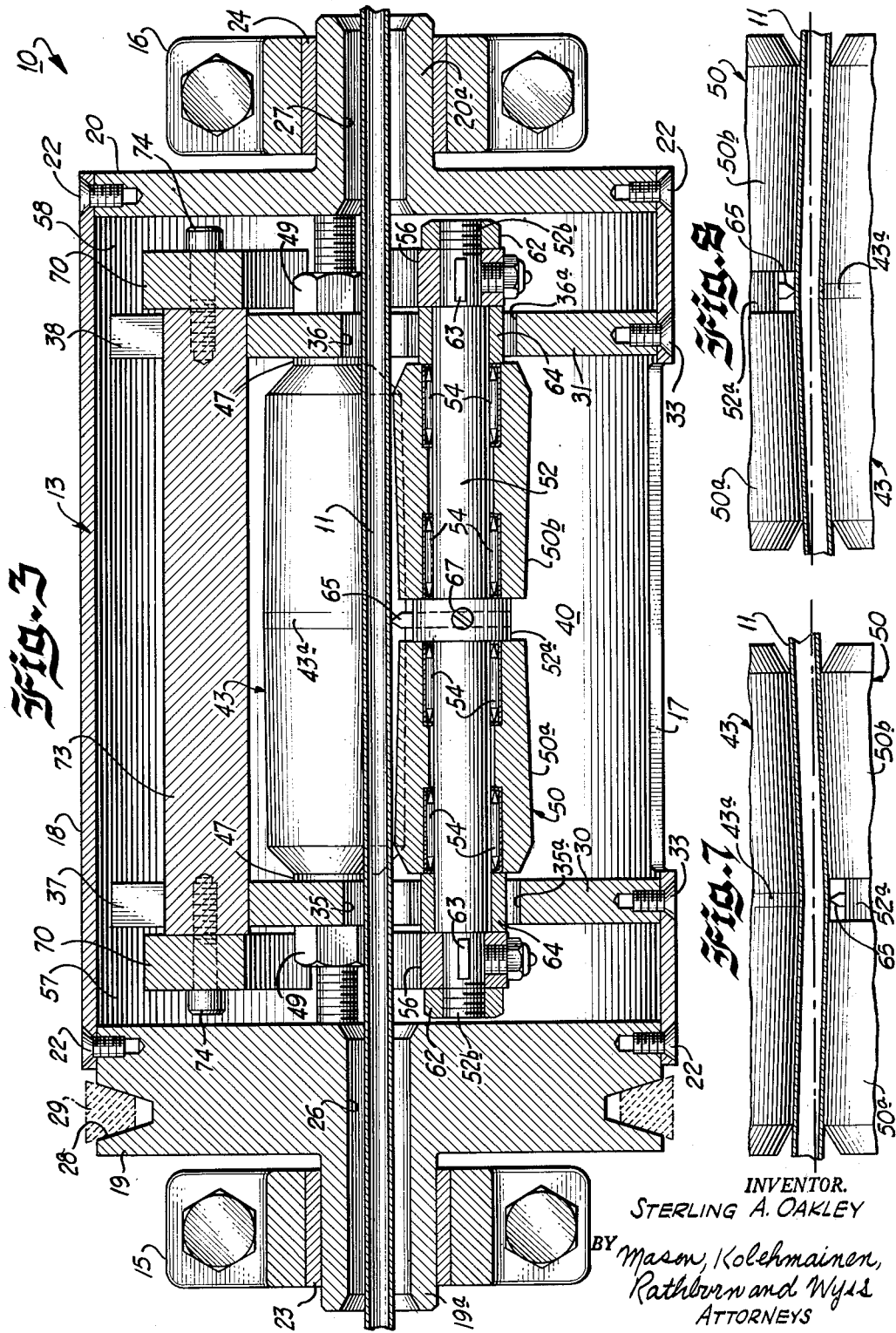

United States Patent Office 3,138,308
Patented June 23, 1964

3,138,308
TUBE CUTTING APPARATUS
Sterling A. Oakley, Lincolnwood, Ill., assignor, by mesne assignments, to Oakley Industries, Incorporated, a corporation of Illinois
Filed May 8, 1961, Ser. No. 108,459
9 Claims. (Cl. 225—2)

The present invention relates to tube cutting apparatus and, more particularly, to an improved method and apparatus for cutting tubes into lengths without leaving any burrs.

This invention is an improvement over that described in my copending application, Serial No. 817,277, filed June 1, 1959, now Patent No. 3,035,148, and assigned to the same assignee as this invention.

Welded tubing is extensively used today for many purposes such as, for example, airplane struts, fluid carrying conduits and sheaths for electric heating elements. Such tubing is commonly constructed from an effectively endless strip of metal which is formed into a cylinder and welded along the abutting edges thereof to form a longitudinally welded seam.

Although the present invention is concerned with cutting tubing of all types in a burr-free manner, it is particularly well adapted for cutting tubing used as the sheaths of electric heating elements. Consequently, such specific application of the invention is herein described by way of example. Such tubing with a welding seam, of course, is manufactured in a continuous process which means that the tubing is effectively endless. However, during the manufacturing process, it is necessary to cut the tubing to the various lengths desired depending on the use to which it is put. In the case of electric heating elements, the sheaths may have a wide variety of lengths depending on whether or not they are going to be used in a flat iron, an electric range, or with some other heating apparatus.

The endless tubing may, of course, always be cut to a predetermined length as desired. However, such cutting results in the production of a burr and the tubing then must go through a deburring machine to remove the burrs produced by the cutting operation. Additionally, chips formed by the cutting or deburring operation sometimes lodge in the tubing with very undesirable effects when it is considered that the tubing is used for the sheath of a resistance heating element. In my aforementioned copending application, there is described a method and apparatus whereby the endless tubing may be cut to lengths with a burr-free cutting machine so that the steps of deburring and cleaning may be completely eliminated. Although the device therein illustrated is entirely satisfactory from an operational point of view, the apparatus employs electric current to resistance-heat the tube. It is frequently desirable to cut a tube without the employment of electric heating current because of the possible inconvenience or damage made to the tube by the heating, and because of the difficulties arising in the shop from working around electric lines.

Accordingly, it is an object of the present invention to provide a new and improved tube cutting machine.

It is an object of the present invention to provide an improved method and apparatus for cuttnig tubing without the production of any burrs.

Still another object of the present invention resides in the provision of an improved method of rapidly severing tubing into predetermined lengths in a burr-free manner without the use of resistance heating current.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings, in which;

FIG. 1 is a perspective view of the cutting mechanism of a tube cutting apparatus according to the present invention;

FIG. 2 is an elevational view of the cutting mechanism of FIG. 1 partly broken away to illustrate certain internal parts with the parts shown in the rest position;

FIG. 3 is a sectional plan view, to a larger scale, taken along line 3—3 of FIG. 1;

FIG. 4 is a sectional end view taken along line 4—4 of FIG. 2, assuming that FIG. 2 shows the complete structure, also illustrating the mechanism in a rest position;

FIG. 5 is a sectional end view identical with FIG. 4 but illustrating the parts during an actual cutting operation;

FIG. 6 is a partial end sectional view taken along line 6—6 of FIG. 2 of the cutting mechanism of the present invention;

FIG. 7 is a partial longitudinal sectional view of the cutting mechanism taken along line 7—7 of FIG. 6 assuming that FIG. 6 shows the complete structure and with certain dimensions exaggerated;

FIG. 8 is a partial longitudinal sectional view like FIG. 7 but with the mechanism parts one hundred and eighty degrees out of phase with the position of FIG. 7; and FIG. 9 is a schematic circuit diagram of the cutting apparatus of the present invention incorporating the cutting mechanism illustrated in FIGS. 1 to 8 of the drawings.

Briefly, the present invention is concerned with an apparatus for cutting tubing into lengths without leaving a burr and includes a plurality of elongated roller means which taper along the longitudinal extent thereof thereby to provide either a slightly convex or slightly cancave surface and which are adapted to tangentially engage a tube to be cut so as to gyrate the tube at points spaced from the point to be cut while the tube is held against rotation. Additionally, the improved method includes peripherally scoring the tube at the point to be cut and gyrating the tube at points spaced from the scored portion to sever the tube at the scored portion in a burr-free manner.

Referring now to the drawings, there is illustrated a tube cutting apparatus 10 in accordance with the present invention which is capable of cutting tubing, such as 11, into predetermined lengths without the formation of burrs at the cut tube ends. It should be understood that the tube cutting apparatus 10 is capable of cutting to any predetermined lengths continuous lengths of tubing produced of any material regardless of how the tube is manufactured or the nature thereof. The present invention is concerned not only with the improved tube cutting apparatus but wtih an improved method of cutting tubing. The tube cutting device 10 comprises a base 12 of any suitable form for rotatably supporting thereon a drumlike mechanism generally designated at 13. As illustrated in the drawings, the base 12 is provided with an opening 14 therein to accommodate the drumlike mechanism 13. A pair of spaced bearing blocks 15 and 16 secured to the base 12 are provided rotatably to support the drumlike mechanism 13.

The drumlike mechanism 13 comprises an outer generally cylindrical shell or drum 18 having an access opening 17 therein to the ends of which are secured a pair of end plates 19 and 20. As illustrated in the drawings, these end plates each comprise a disklike portion having an outer diameter corresponding to the inner diameter of the shell 18 so as to be receivable within the ends of the shell. Suitable screws or fastening means 22 then secure the shell 18 and end plates 19 and 20 together as a unitary structure. The end plate 19 includes a tubular axial projection or trunnion 19a integrally formed with the end plate 19 which functions as a stub shaft suitably journaled in a bearing 23 supported in bearing block 15. In a similar manner the end plate 20 includes an integral tubular axial projection or trunnion 20a rotatably journaled in a bearing 24 supported by bearing block 16. The passageway defined within the tubular projection 19a extends through the entire end plate 19 and is designated by the reference numeral 26. A similar passageway 27 extends through the end plate 20 including projection 20a thereby defining a passageway along the axis of rotation of drumlike mechanism 13 for the tubing 11 supplied to the tube cutting device 10.

In order to rotate the drumlike mechanism 13 about its longitudinal axis or, in other words, the axis of trunnions 19a and 20a, the end plate 19 has the disklike portion thereof considerably thicker than that of end plate 20 so as to define a pulley portion having a V groove 28 therein for receiving a conventional V belt 29. It will be appreciated that the end plate 19 is, therefore, both an end plate and a pulley. The V belt 29 may be connected to any suitable prime mover such as 85 shown in FIG. 9 of the drawings. Preferably the prime mover should be one of the clutch-brake type prime movers commonly available on the market wherein a constantly running electric motor has associated therewith a clutch and brake arrangement whereby a driven device may be brought to top speed almost instantly and when at top speed may be stopped almost instantly. It will become apparent from the ensuing description that drumlike mechanism 13 should be stopped and started quickly to insure high speed tube cutting. Such clutch-brake type motors usually have a driving pulley 86 which is driven by the motor 85 or quickly stopped in response to a pneumatic or solenoid actuating means. In a device built in accordance with the present invention a clutch-brake type motor with a solenoid actuator was employed. The winding of such solenoid is schematically indicated as 87 in FIG. 9 of the drawings. Upon actuating the solenoid the power from a continuously energized electric motor 85 brings drumlike mechanism 13 to top speed almost instantly or stops it almost instantly.

For the purpose of supporting a suitable cutting mechanism within shell 18, there are provided a pair of intermediate disklike supporting plates 30 and 31 which have a diameter corresponding to the interior diameter of the shell 18. These intermediate supporting plates 30 and 31 are secured within the shell 18 approximately at the edges of the access opening 17 as by suitable fastening means 33. So that these plates do not interfere with the tubes to be cut, they each include a center aperture aligned with the apertures 26 and 27 defined in the end plates 19 and 20 previously described. As illustrated, plate 30 is provided with central aperture 35 and plate 31 is provided with central aperture 36. For a purpose which will become apparent from the ensuing description, each of the intermediate plates 30 and 31 is provided with a notch of substantially arcuate extent designated as 37 and 38, respectively, for the plates 30 and 31 (FIGS. 3, 4 and 5). The chamber defined within housing 18 between plates 30 and 31 and visible through opening 17 might be designated as the cutting chamber.

In accordance with the present invention rotatably supported within the cutting chamber 40 are a plurality of bending rollers whose function is to cause predetermined flexing of the tube 11 to be cut in a manner described hereinafter. To this end there are provided a pair of rollers 42 and 43 which are rotatably supported upon a pair of stationary shafts 44 and 45 secured to intermediate plates 30 and 31 as best shown in FIGS. 4, 5 and 6 of the drawings. The rollers 42 and 43 are mounted one directly above the other and the stationary shafts 44 and 45 preferably each have a threaded end portion of reduced cross section extending through aligned openings in intermediate plates 30 and 31. Preferably suitable thrust washers 47 are provided on the stationary shafts 44 and 45 adjacent the intermediate plates 30 and 31 to receive the rollers 42 and 43 therebetween. It will be understood that suitable bearings such as needle bearings or the like will be provided for the rollers 42 and 43 surrounding the shafts 44 and 45. Suitable fastening means 49 secured to the threaded ends of shafts 44 and 45 assure that the parts are retained in the assembled relationship shown. In accordance with the present invention the rollers 42 and 43 are provided with a slight taper (exaggerated in the drawings) from the center of the rollers toward each end so that the rollers 42 and 43 might be termed convex rollers, the maximum diameter being at a short intermediate section designated as 42a and 43a, respectively, for the rollers 42 and 43. In a device built in accordance with the present invention the rollers 42 and 43 were tapered from the center toward the end by a very small angle of slightly less than 1°. The axis of rotation of the rollers 42 and 43 is so located relative to a particular size of tubing 11, that the centers 42a and 43a of the convex rollers 42 and 43 just touch the tube 11 as clearly shown in FIG. 6 of the drawings. Since the shafts 44 and 45 move as a unit with mechanism 13, the rollers 42 and 43 move like sun gears around the stationary tube 11.

In order to cause flexing of tube 11 within cutting chamber 40 there is provided what might be termed a concave roller generally designated as 50, but which actually comprises two separate roller members designated as 50a and 50b rotatably mounted on a shaft 52. Shaft 52 like shafts 44 and 45 does not rotate, but unlike the shafts 44 and 45 which are fixed relative to plates 30 and 31, the longitudinal axis of shaft 52 is movable relative to the longitudinal axis of the tube 11. The shaft 52 has an integral central enlargement 52a which separates the rollers 50a and 50b rotatably supported on shaft 52 on either side of this enlargement. Preferably suitable bearings 54, clearly shown in FIG. 3 of the drawings, are provided for rollers 50a and 50b. The rollers 50a and 50b are each tapered from end to end so as to have the smallest diameter adjacent the enlargement 52a of the shaft 52 whereby the taper causes the two roller sections 50a and 50b to define a concave roller 50. In a device built in accordance with the present invention the roller portions 50a and 50b had a taper of the order of a degree and a half from the outer end toward the center. This taper is shown in exaggerated form on the drawings.

For the purpose of movably supporting the axis of shaft 52 for bodily movement toward and away from tube 11, there are provided a pair of identical shaft supporting links 56, one disposed between the plates 19 and 30, hereinafter designated as link chamber 57, and the other disposed between the plates 31 and 20, hereinafter designated as link chamber 58. Since these links 56 and parts connected thereto are identical, only the link 56 and associated parts in link chamber 58, best shown in FIGS. 4 and 5 of the drawings, will be described but corresponding reference numerals will be applied to parts in link chamber 57. One end of each link 56 is pivotally supported on pivot pin 59 extending between the respective plates defining chamber 58. Suitable spacer members 60 and 61, best shown in FIGS. 2 and 3 of the drawings, position the links 56 within the chambers 57 and 58.

In order that links 56 may support shaft 52 for bodily movement relative to tube 11, the ends of the shaft extend through enlarged openings 35a and 36a in intermediate plates 30 and 31 which may be lateral enlargements of the central passageways 35 and 36 as clearly shown in FIGS. 4 and 5 of the drawings. Moreover the ends of shaft 52 are provided with portions 52b of reduced cross section which extend through openings in links 56. Preferably suitable spacers 64 properly space the rollers 50a and 50b from the links 56 as clearly shown in FIG. 3 of the drawings. As illustrated, the ends 52b are threaded whereby suitable nuts 62 secured to these threaded ends hold the parts in assembled relationship. To prevent the shaft 52 from rotating relative to the supporting links 56 cooperating keyways are provided in shaft 52 and links 56 for receiving keys 63. It will be apparent that pivotal movement of the links 56 about pivot pins 59 will cause the concave roller 50 to move toward and away from the tube 11.

In order initially to score the tube 11 on the outer periphery at the point along the length thereof where it is desired to cut the same, there is provided a scoring tool 65, best shown in FIGS. 2, 3, 6, 7 and 8 of the drawings. The scoring tool 65 is longitudinally movable in a passageway 66 defined in the central enlargement 52a of the shaft 52. A suitable set screw 67 secures the scoring tool in the desired position so that as the concave roller 50 engages the tube 11, the scoring tool 65 will produce a slight scoring on the periphery of the tube, the extent of which depends on the adjustment of the tool 65 as viewed in FIG. 6 of the drawings. From the above description it is apparent that if the concave roller 50 is forced against the tube 11 which is already in engagement with the convex rollers 42 and 43 and the drum mechanism 13 is rotated, not only will the rollers 42, 43 and 50 revolve around the stationary tube 11 similar to sun gears, but the scoring tool 65, which also revolves around tube 11, will score the tube at the point cutting is desired. Due to the tapers provided on the rollers, the portions of the tube adjacent the remote ends of the roller will be gyrated to a very limited extent with the resultant flexing of the tube on either side of the scoring relative to the point of scoring. FIGS. 7 and 8 show in exaggerated form two positions of the drum mechanism 13 separated by one hundred and eighty degrees of rotation. It will be understood that due to the very slight taper of the rollers, mentioned above, the tube on either side of the score line is gyrated through a very small circle of gyration which, however, has been found to be adequate and insures burr-free cutting in a matter of seconds without the slightest damage to the tube 11.

In accordance with the present invention the concave roller 50 is normally biased away from the tube 11 or, in other words, the links 56 are biased so as to tend to cause counterclockwise pivotal movement thereof about pivot shaft 59, as viewed in FIGS. 4 and 5 of the drawings. At the same time centrifugal forces developed by virtue of periodical rotation of drumlike mechanism 13 are employed to move concave roller 50 toward tube 11 to cause burr-free cutting thereof. To accomplish this, there is provided in each link chamber 57 and 58 a weight supporting link 70 of somewhat arcuate configuration, as best shown in FIGS. 4 and 5 of the drawings. The links 70 are pivotally mounted at one end thereof to pivot shafts 71 suitably supported within the plates defining the chambers 57 and 58. Preferably spacer members 60 and 61 identical with spacer members of the same reference numerals are employed as clearly shown in FIG. 2 of the drawings. Supported adjacent the free end of links 70 is a weight 73 suitably secured to the links 70 as by fastening means 74. Since the arcuate weight supporting means 70 are disposed outside the cutting chamber 40, the purpose of notches 37 and 38 in the intermediate plates 30 and 31 is readily apparent, since it permits movement of the weight 73 and associated supporting links 70 about the common axis of pivot shafts 71.

In order that the arcuate weight supporting links 70 may control the concave roller supporting links 62 and, hence, the concave roller 50, the links 56 are each provided at their free ends with a projection 56a somewhat in the form of a gear tooth while the arcuate weight supporting links 70 are provided with a corresponding pair of bifurcations 70a and 70b (FIGS. 4 and 5) which in effect define two gear teeth for receiving the projection 56a therebetween. It will readily be apparent from FIGS. 4 and 5 of the drawings that clockwise rotation of weight supporting arcuate links 70 about pivot pin 71 will cause counterclockwise rotation of roller supporting links 56 about pivot shafts 59 or, in other words, will cause the concave roller 50 to move away from tube 11 to be cut. Obviously the reverse is also true.

For the purpose of normally biasing the roller 50 away from the tube 11 there is provided in each of the link chambers 57 and 58 a tension spring 75 which has one end thereof connected to a spring pin 76 suitably secured to the associated intermediate plate 30 or 31. The other end of the tension spring 75 is connected to a lug 77 suitably secured to the associated arcuate weight supporting link 70. With this arrangement the spring 75 normally biases the concave roller to the position shown in FIG. 4 of the drawings so that tube 11 may readily move between the assembly of rollers 42, 43 and 50 (FIG. 6).

In order to limit the maximum movement of the concave roller 50 away from the tube 11 and, consequently, to limit the maximum clockwise rotation of the weight supporting arms 70, the weight 73 engages the bottom of the notches 37 and 38 as clearly shown in FIG. 4 of the drawings. Maximum movement of the concave roller 50 toward tube 11 and corresponding movement of the weight supporting links 70 is controlled by a stop pin 79 adjustably supported by the link 70 so as to engage the interior of the shell 18. This may be adjusted so the same cutting device may be used for tube 11 of different sizes in which case different size rollers 42, 43 and 50 would, of course, be required. To insure proper support of the intermediate plates 30 and 31, a spacing sleeve 80 in each of the chambers 57 and 58 held in place by suitable bolt 81 is preferably provided.

For the purpose of holding the tube 11 against rotation during a tube cutting operation, suitable holding means generally schematically designated at 82 (FIG. 9) are provided for each end of the tube 11 projecting from the rotating drumlike mechanism 13. The holding mechanism is preferably solenoid operated and solenoid windings 83 are schematically illustrated. Preferably the windings 83 are connected in parallel with each other and in parallel with the winding 87 referred to above for controlling the clutch-brake type motor 85 causing rotation of drum 13 and this parallel connected circuit is connected to a source of power, indicated as 89 in FIG. 9 of the drawings, through a switch 90 controlled by the end of tube 11. In other words, depending upon the length to which the continuous tube 11 is to be cut, it will be moved through the cutting apparatus 10 until an end thereof actuates the switch 90 at which time the holding devices 82 will clamp the tube 11 against rotation and the drumlike cutting mechanism 13 will be rotated at high speed for a few seconds controlled by a timer generally designated at 91 resulting in cutting of the tube at which time the windings 83 are de-energized as is also the solenoid winding 87 of the clutch-brake motor 85, and the cutting mechanism 13 is quickly stopped whereby the tube 11 is again moved through machine 10 until the switch 90 is actuated to start a new cycle.

In view of the detailed description included above, the operation of the cutting apparatus of the present invention will readily be understood by those skilled in the art. When the tube clamping devices 82 are energized the cutting mechanism 13 is almost instantly brought up to speed with the result that the centrifugal forces acting on weight 73 moving it from the FIG. 4 to the FIG. 5 position cause the concave roller 50 to move from the position shown in FIGS. 4 and 6 to the position shown in FIG. 5. A few revolutions of drum 13 will cause not only scoring of the tube 11 at the place where cutting is desired but flexing of the tube, as illustrated in exaggerated form in FIGS. 7 and 8. This results in burr-free cutting at the place of scoring. The flexing is very minimal and still results in cutting of the tube with but a few revolutions of mechanism 13. It will be appreciated that the rollers 42, 43 and 50 and the scoring tool 65 revolve around the tube 11 causing rapid flexing of the tube through a very small angle which is effective quickly and cleanly to break the tube along its score line.

While there has been shown and described a particular embodiment of the present invention, it is not desired that the invention be limited to the construction and method shown and described for it will, of course, be obvious to those skilled in the art that changes and modifications may be made without departing from the invention. It is, therefore, aimed in the appended claims to cover all such changes and modifications as fall within the true spirit and scope of the present invention.

What is claimed as new and desired to be secured by Letters Patent of the United States is:

1. The method of cutting tubing into lengths without leaving a burr which comprises holding said tubing against rotation, holding in fixed position a small portion of said tubing at the place where said tubing is to be cut, gyrating said tubing at points remote from said small portion, and scoring said tubing around the entire periphery thereof at said small portion.

2. The method of cutting tubing as set forth in claim 1 wherein the two last-mentioned steps are performed simultaneously.

3. The method of cutting tubing into lengths without leaving a burr which comprises holding said tubing against rotation, gyrating portions of said tubing on either side of the place where it is to be cut relative to said place, and scoring said tubing around the entire periphery at said place.

4. Apparatus for cutting tubing into lengths without leaving a burr comprising a plurality of elongated roller means each tapered longitudinally from an intermediate point, and adapted to tangentially clamp a tube longitudinally positioned therebetween, a scoring tool carried by one of said roller means at said intermediate point, supporting means for holding said roller means, and means for rotating said supporting means to move said roller means around a tube.

5. Apparatus for cutting tubing into lengths as set forth in claim 4 wherein one of said roller means tapers outwardly from said intermediate point and one of said roller means tapers inwardly from said intermediate point.

6. Apparatus for cutting tubing as set forth in claim 5 including centrifugal actuating means for moving one of said roller means toward the other of said roller means in response to rotation of said supporting means.

7. Apparatus for cutting tubing into lengths without leaving a burr, comprising a drumlike outer member, a pair of spaced supporting plates secured within said shell, a pair of spaced bearing means, a pair of end plates closing the respective ends of said shell and each including an outwardly extending concentrically positioned trunnion journaled in a respective one of said bearing means, one of said end plates including means for rotating said member, said plates having concentric openings to provide for passing a tube therethrough, a first and a second shaft respectively supported by said supporting plates radially outwardly from the center, a first and a second roller means rotatably carried by respective ones of said shafts, said roller means tapering inwardly substantially from their center, a third shaft extending between said supporting plates radially outwardly from the center of said plates, third roller means rotatably carried by said third shaft, said third roller means tapering outwardly from the center, scoring means carried by said third shaft near its center, and centrifugal means carried by at least one of said plates for moving said third shaft toward the center of said member to bring said roller means tangentially into engagement with a tube.

8. Apparatus for cutting tubing into lengths without leaving a burr, comprising a supporting member, a pair of spaced bearing means, said support means including concentrically positioned trunnions journaled in respective ones of said bearing means, means associated with said supporting member for rotating said member, at least one roller means rotatably carried by said member radially outwardly from its center and tapering substantially from its center toward its ends in a first radial direction, additional roller means rotatably carried by said member tapering from the center toward its ends in an opposite radial direction from said first direction, scoring means carried for substantially radial movement relative to said member, and centrifugal means carried by said member for moving at least one of said roller means toward the other in response to rotation of said member, said member having concentric openings therethrough to provide for a tube to be positioned between said roller means and to be tangentially engaged by said roller means when said one of said roller means is moved toward the other.

9. Apparatus for cutting tubing into lengths without leaving a burr, comprising means for holding said tubing against rotation, means for holding in fixed position a small portion of said tubing at the place where said tubing is to be cut, means for gyrating said tubing at points remote from the small portion of said tubing held in fixed position, and scoring means for scoring said tubing around the entire periphery thereof at the small portion where said tubing is to be cut.

References Cited in the file of this patent
UNITED STATES PATENTS

| | | |
|---|---|---|
| 2,638,985 | Ross | May 19, 1953 |
| 2,736,380 | Dillenburger | Feb. 28, 1956 |
| 2,970,730 | Schwarz | Feb. 7, 1961 |
| 2,982,456 | Hsu et al. | May 2, 1961 |